Aug. 8, 1967    F. M. MATHENY    3,334,389
TROWELING DEVICE
Filed June 7, 1965    2 Sheets-Sheet 1
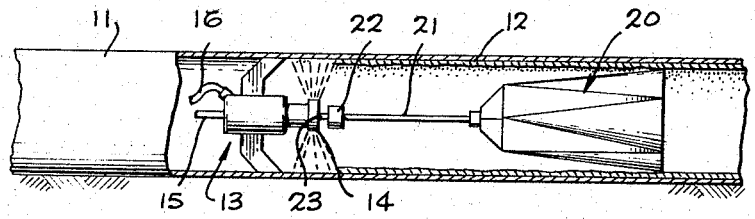
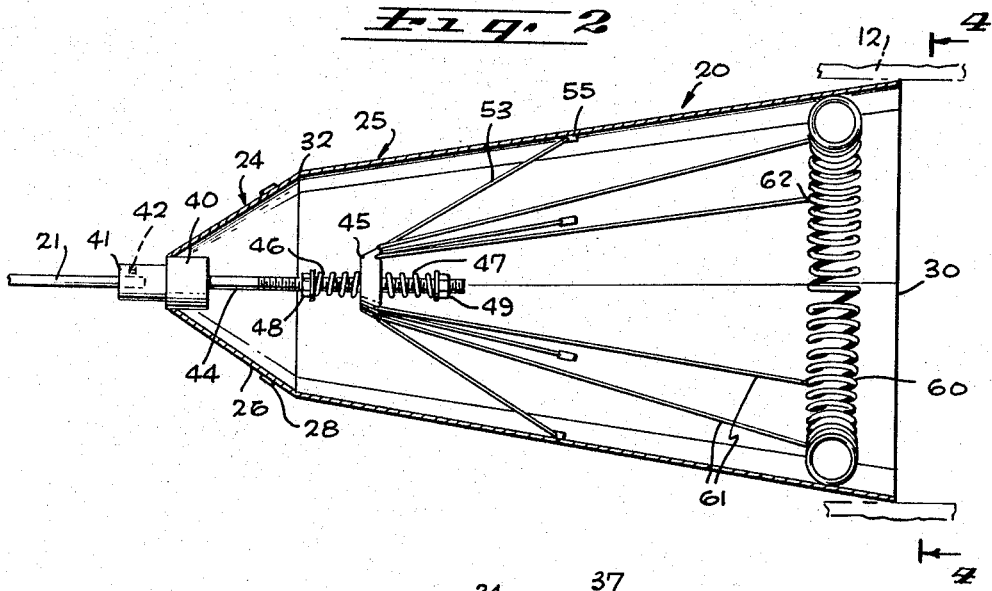
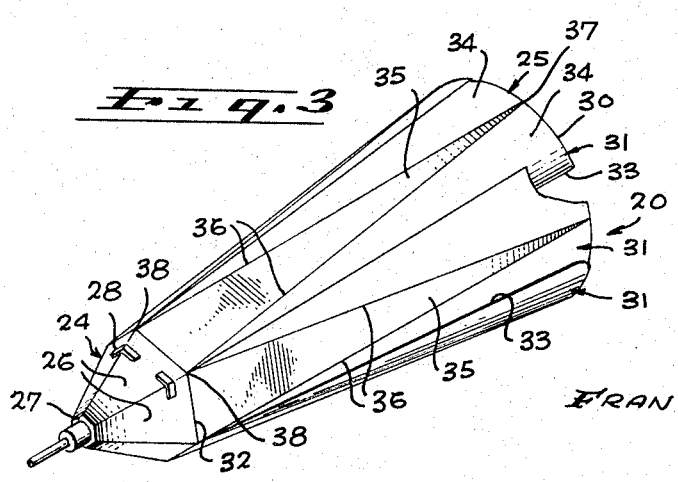
FRANCIS M. MATHENY
INVENTOR.
BY
Mason & Graham
ATTORNEYS Aug. 8, 1967　　　　　　F. M. MATHENY　　　　　　3,334,389
　　　　　　　　　　　TROWELING DEVICE
Filed June 7, 1965　　　　　　　　　　　　　　　2 Sheets-Sheet 2
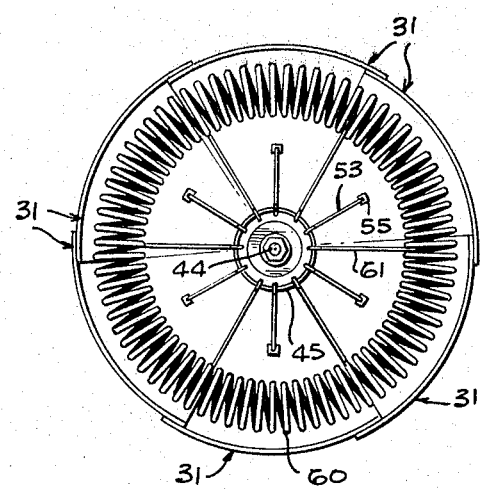
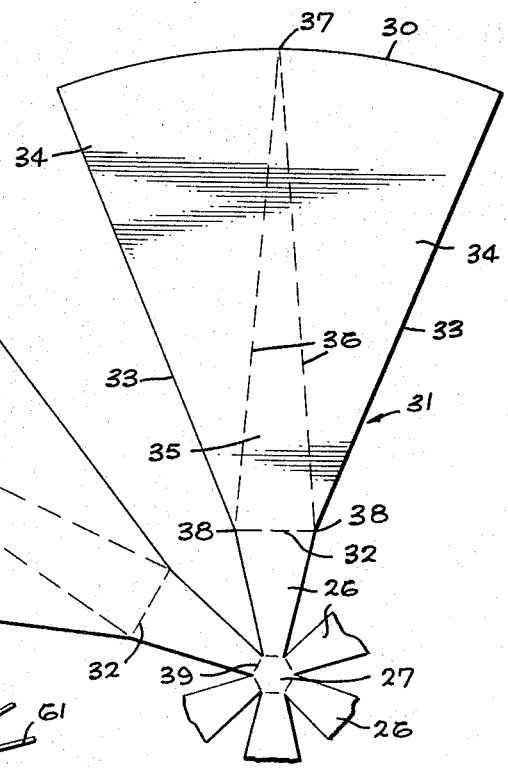
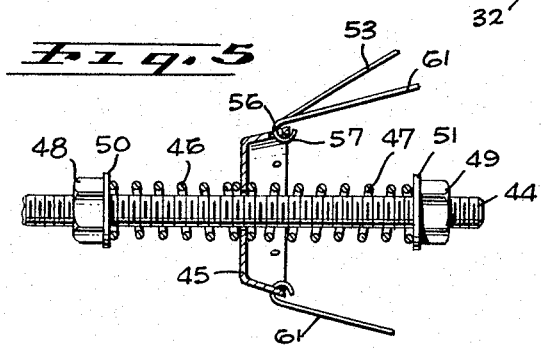
FRANCIS M. MATHENY
INVENTOR.
BY Mason & Graham
ATTORNEYS United States Patent Office 3,334,389
Patented Aug. 8, 1967

3,334,389
TROWELING DEVICE
Francis M. Matheny, Lynwood, Calif., assignor to Pipe Linings, Inc., Wilmington, Calif., a corporation of California
Filed June 7, 1965, Ser. No. 461,748
8 Claims. (Cl. 25—38)

This invention has to do with troweling devices for use in smoothing a lining of cement mortar applied to the interior of a pipeline in place in the ground by a mortar dispensing machine which precedes the troweling device as both are moved axially through the pipeline.

An object of the invention is to provide a novel troweling device adapted to be drawn through a pipe, pipeline or conduit for the purpose of evenly distributing and smoothing a previously applied lining of cement mortar or other similar lining material.

Another object is to provide a device of the type indicated made of sheet metal formed in a novel manner to provide a unique body construction particularly suited for troweling.

A further object is to provide a troweling device of the type indicated in which the body embodies a novel one-piece construction, apart from fastening elements or the like, and in which the body can be formed from a single sheet of metal.

A still further object is to provide a device which adjusts automatically to the variations in the internal diameter of the pipe as the device is drawn therethrough.

Another object is to provide an extremely flexible troweling device which is relatively light in weight.

Still another object is to provide a device of the type indicated embodying novel means for accurately adjusting the diameter of the body over a usable range so as accurately to fit the pipe.

These and other objects will be apparent from the drawings and the following description. Referring to the drawings:

FIG. 1 is a diagrammatic view showing a troweling device embodying the invention as it would appear in operation being drawn through a pipeline behind a mortar dispensing machine;

FIG. 2 is a central longitudinal sectional view of the troweling device of FIG. 1;

FIG. 3 is an isometric view of the troweling device;

FIG. 4 is an end elevational view on line 4—4 of FIG. 2;

FIG. 5 is a fragmentary sectional detail view on a larger scale of the adjustment means; and FIG. 6 is a fragmentary developed plan view of the sheet metal body.

More particularly describing the invention, in FIG. 1 I show a pipeline 11 which may be considered as being in place in the ground. This is being lined with a coating of cement mortar or the like 12 by means of a lining or mortar dispensing machine 13. The machine shown is of the centrifugal type having a mortar dispensing head 14 through which the mortar is flung or thrown against the interior wall of the pipe. Numeral 15 designates a cable or other member for pulling the device through the pipeline and numeral 16 designates a mortar supply hose which may lead to a source of cement mortar.

The troweling device of the invention is designated generally by numeral 20 and is shown being drawn through the pipeline on the end of a flexible shaft 21 which may be attached to a ball joint 22 at the back end of the shaft 23 of the mortar dispensing unit 13. The shaft 21 does not rotate, however.

Referring now to FIGS. 2-6, the troweling device has a sheet metal body which includes a forward section designated generally by numeral 24 and a trailing section designated generally by numeral 25. The forward section is made up of a plurality of trapezoidal sections 26 which are formed as a continuation of a polygonal front wall 27. The sections 26 are fastened together by metal straps 28 which are riveted, bolted, welded or otherwise secured to the parts across the joints so that the forward section may be described as a frustum of a polyhedron.

The trailing section 25 increases in diameter from front to rear and although the forward end thereof where it meets and joins the sections 26 is polygonal in cross section, the rear edge 30 thereof is circular. This trailing section is made up of a plurality of overlapping sections or segments 31 which can best be described by referring to FIG. 6 which shows a developed plan of the sheet metal body of the device. From this figure it will be apparent that the forward wall 27 is at the center and that joined to this are the aforementioned sections 26 of trapezoidal form. Beyond the sections 26 and beginning at lines 32 where the material is bent are the segments 31, each of which is of substantially trapezoidal form except for the fact that the outer edge thereof, designated 30, is arcuately curved. The segments 31 are each defined by sides or lateral edges 33 which diverge in a direction outwardly or toward the edge 30. Each segment is laterally curved throughout areas 34 on each side of the center area 35, the radius of curvature of the areas 34 being substantially equal to the radius of curvature of the pipe in which the device is to be used. The areas 34 are defined by the outer edge 30, the lateral edges 33 and by two inner boundary lines designated 36. These two lines converge at a point 37 on the outer edge 30 and from there inwardly diverge to terminate at the corners 38 of the sections 26.

In the manufacture of the sheet metal body the device is first stamped out to appear as in FIG. 6 after which the areas 34 may be curved laterally and subsequently the material bent along lines 39 and 32 so that it will take the form shown in the completed device. It will be apparent from FIG. 2 that the width of the segments is such that they overlap.

The body of the device is provided with a mounting block 40 inside the forward section and this includes a forwardly projecting socket portion 41 having a setscrew 42 to receive and secure the flexible shaft 21. Extending rearwardly and axially from the mounting block 40 is a threaded rod 44 on which I provide an apertured adjusting plate 45. Coil springs 46 and 47 are provided on opposite sides of the plate on the rod and these are adjustably tensioned and held by nuts 48 and 49 and washers 50 and 51 associated therewith, respectively.

I provide a tie rod 53 between plate 45 and each segment or section 31 of the body. The rods are secured at their outer ends to the flat center section 35 at one end and to the plate 45 at the other. Eye brackets 55 are provided on the segments and apertures 56 provided in plate 45 to receive the hooked ends 57 of the rods.

Inwardly a short distance from the rear edge 30 of the body I provide a coil spring 60 arranged in circular form which is adapted to hold the trailing end portions of the segments in place against the mortar lining and yieldably resist collapse thereof. This spring is held against axial movement by a plurality of rods 61, the ends of which are hooked at 62, 56 to be secured to the spring and to the plate, respectively.

It will be apparent that with the construction described the diameter of the troweling device can be adjusted by means of the plate 45 and associated parts. At the same time the springs 46 and 47 associated with the plate and the spring 60 provide the device with an inherent flexibility and resiliency.

In the operation of the device, it is pulled through the pipeline behind the cooling mortar-applying machine 13, as shown in FIG. 1, or in any other suitable manner and serves to smooth and evenly distribute the mortar coating which has previously been applied to the interior of the pipeline.

Although I have illustrated and described a preferred form of my invention, I contemplate that various changes and modifications can be made therein without departing from the invention, the scope of which is indicated by the following claims.

I claim:

1. A troweling device adapted to be drawn through a pipeline to smooth a previously applied lining of cement mortar or the like, comprising a body of sheet metal formed to provide a forward section of the approximate shape of a frustum of a regular polyhedron and a trailing section joined thereto and terminating in a substantially circular trailing edge of greater diameter than the remainder of the body, said trailing section being formed of a plurality of segments having overlapping edges, said segments each being laterally curved at the trailing edge and laterally flat at the forward edge, means at the forward end of said forward section for attaching a towing element, and resilient means yieldably resisting radial inward collapse of the trailing section of said body.

2. The troweling device set forth in claim 1 in which each segment of the trailing section of the body is an integral continuation of the front section of the body.

3. The trailing device set forth in claim 1 in which the sides of the front and trailing sections of the body are formed from a single sheet of metal.

4. An article of manufacture for incorporation in a troweling device adapted to be drawn through a pipeline to smooth a previously applied lining of cement mortar or the like, comprising a sheet of metal formed to provide a relatively small polygonal central section, an intermediate-sized trapezoidal section extending from each margin of the central section, a relatively large outer section of truncated pie-section-shape extending from the outer margin of each trapezoidal section, each outer section being laterally curved throughout two areas defined by the lateral margins of the section, the outer margin of the section, and by two lines converging at the center of the outer margin and diverging therefrom to the corners of the trapezoidal section.

5. The article set forth in claim 4 in which said sheet is bent at each of the two parallel margins of the trapezoidal sections such that the central section and the trapezoidal sections form a forward body section of the approximate shape of a frustum of a polyhedron, and said outer sections extend therefrom in overlapping relation to define a circle at the outer edges, and in which means is provided securing said trapezoidal sections in position.

6. A troweling device adapted to be drawn through a pipeline to smooth a previously applied lining of cement mortar or the like, comprising a forward section having means for attaching a towing element, and a trailing section attached to the rear of said forward section, said trailing section being formed of a plurality of segments each attached at its forward end to the forward section, said segments each being a piece of sheet metal characterized by a straight front edge and by a laterally curved rear edge, said segments being disposed in laterally overlapping relation to form a rearwardly diverging trailing section, and means for yieldably holding said segments against further overlapping and consequent radial inward contraction of the body.

7. A troweling device adapted to be drawn through a pipeline to smooth a previously applied lining of cement mortar or the like, comprising a body formed to provide a forward section and a generally circular hollow trailing section, said trailing section being formed of a plurality of overlapping segments of sheet metal, an adjustment plate mounted on the axis of the device, tie rods connecting the individual segments of the trailing section with said adjustment plate, said tie rods extending rearwardly from said adjustment plate, means for adjustably positioning said adjustment plate axially of the device, a coil spring of annular form inside the trailing section inwardly from but adjacent to the trailing edge thereof, and tie rods connecting said spring to the adjustment plate.

8. A troweling device comprising a hollow body formed of sheet metal characterized by a forward section of reduced diameter and a trailing section of gradually increasing diameter toward its trailing edge, said trailing section being formed of a plurality of segments, each segment having a straight forward edge portion and a convexly arcuate, laterally curved trailing edge, said segments being disposed in laterally overlapping relation, means for attaching a towing element to said forward section, spring means yieldably holding said segments against further overlapping and consequent radial inward contraction of the trailing section, and adjustable means for controlling the diameter of the trailing section.

References Cited

UNITED STATES PATENTS

| | | | |
|---|---|---|---|
| 2,261,928 | 11/1941 | Perkins et al. | 25—38 X |
| 2,297,163 | 9/1942 | Perkins | 25—38 |
| 2,555,377 | 6/1951 | Scott | 25—38 |
| 2,924,867 | 2/1960 | Perkins | 25—38 |
| 3,188,710 | 6/1965 | Perkins | 25—38 |

FOREIGN PATENTS

| | | |
|---|---|---|
| 106,653 | 2/1939 | Australia. |
| 24,557 | 11/1956 | Germany. |
| 630,472 | 5/1936 | Germany. |

WILLIAM J. STEPHENSON, *Primary Examiner.*